United States Patent [19]

Chandra et al.

[11] Patent Number: 4,989,216
[45] Date of Patent: Jan. 29, 1991

[54] DOUBLE CONJUGATE LASER AMPLIFIER

[75] Inventors: Suresh Chandra, Falls Church; Geraldine H. Daunt, Arlington, both of Va.

[73] Assignee: The United States of America as represented by the Secretary of the Army, Washington, D.C.

[21] Appl. No.: 500,963

[22] Filed: Apr. 18, 1990

[51] Int. Cl.⁵ .............................................. H01S 3/082
[52] U.S. Cl. ...................................... 372/97; 372/99; 330/4.3
[58] Field of Search ..................... 372/99, 106, 71, 72, 372/97; 330/4.3

[56] References Cited

U.S. PATENT DOCUMENTS

| | | | |
|---|---|---|---|
| 4,618,783 | 10/1986 | Pradere et al. | 372/97 |
| 4,660,205 | 4/1987 | Harter et al. | 372/99 |
| 4,682,340 | 7/1987 | Dave et al. | 372/99 |
| 4,709,368 | 11/1987 | Fukuda et al. | 372/99 |
| 4,725,787 | 2/1988 | Chandra | 372/98 |
| 4,875,219 | 10/1989 | Russell | 372/99 |

Primary Examiner—Frank Gonzalez
Assistant Examiner—Susan S. Morse
Attorney, Agent, or Firm—Milton W. Lee; Max L. Harwell; Anthony T. Lane

[57] ABSTRACT

A double conjugate laser beam amplifier which twice conjugates the laser input beam and provides an output beam in exactly the same direction and of the same polarization as the input beam while retaining the alignment stability of singly conjugated amplifiers even when the thin film polarizer between two conjugate amplifiers is not stable. A half-wave voltage at a Pockels cell positioned on the beam axis immediately prior to the polarizer controls whether the oscillator beam is transmitted through the polarizer or is reflected off the polarizer toward a first conjugate amplifier for amplification and retroflection back through the first conjugate amplifier and the polarizer into a second conjugate amplifier for further amplification and retroreflection back and is reflected off the polarizer a second time. The double conjugate amplifiers may be cascaded to both increase output and laser beam pulse repetition rate.

16 Claims, 4 Drawing Sheets

DOUBLE CONJUGATE LASER AMPLIFIER

The invention described herein may be manufactured, used, and licensed by the U.S. Government for governmental purposes without the payment of any royalties thereon.

BACKGROUND OF INVENTION

Field—The invention is in the field of high brightness laser systems which use a low energy master oscillator laser beam and a phase conjugated laser amplifier to amplify the oscillator laser beam. Specifically, the invention is cascaded double conjugated laser amplifiers wherein a switched Pockels cell and a polarizer are associated with each of the double conjugate laser amplifiers with the Pockels cell controlling whether the oscillator beam is transmitted directly through the polarizer along the oscillator beam axis or is reflected off the polarizer into and retroreflected from one of the amplifiers and back through the polarizer into and retroreflected from the second amplifier and reflected off the polarizer in the exact same direction as the original oscillator beam as a twice conjugated and amplified laser system output beam.

Prior Art—A prior art phase conjugated laser amplifier is known which is comprised of a laser oscillator that transmits input beam pulses through a thin film polarizer into a single phase conjugated power amplifier comprised of an amplifier, a quarter-wave plate, and a phase conjugated mirror. The amplifier amplifies the beam pulses once on the first pass therethrough. The quarter-wave plate turns the polarization of the once amplified beam from being linear to circular prior to entering the phase conjugate mirror. The pulses are retroreflected from the mirror back through the quarter-wave plate which turns the polarization from being circular to linear but rotated 90° from the original polarization and is amplified a second time as the pulses are passed through the amplifier. The twice amplified output beam pulse exits the laser system at an oblique angle from the direction of the oscillator input beam pulse after being reflected off the thin film polarizer. This change in direction for the output beam from the input beam can be undesirable. Further, the output beam direction is sensitive to any motion of the polarizer even though the amplifier itself provides distortion free amplification and an output direction stable against movements or vibrations of the amplifier.

The present invention solves the above noted problems of the prior art output beam pulse reflecting off the thin film polarizer at an oblique angle by having each of the double conjugate amplifiers conjugate the beam two times, i.e. conjugated once in each of two singly conjugated amplifiers, which form the double conjugate amplifiers. A thin film polarizer positioned between the amplifiers reflects the oscillator input beam off the polarizer into a first amplifier, passes the retroreflected beam back through the polarizer into a second amplifier, and reflects the retroreflected beam back from the second amplifier off the polarizer again. The output beam comes out of each double conjugate amplifier in exactly the same direction as the original input beam. The output beam direction stays constant even if the polarizer is not stabilized such as when it is mounted on a moving military vehicle.

SUMMARY OF THE INVENTION

The invention is comprised of one or a plurality of double conjugate amplifiers with each having Pockels cell switching the beam polarization so as to reflect the beam off a thin film polarizer and into two amplifiers, with one amplifier on each lateral side of the polarizer, in optical alignment with the polarizer. Selective switching of the Pockels cells allow selective amplifications of the oscillator laser beam or bypassing of amplifier pairs. The invention permits all of the double conjugate amplifiers to be fired simultaneously for maximum energy pulse generation or time-multiplexed for a high pulse repetition rate without overheating the amplifiers.

The invention will be better understood with reference to the detailed description in view of the drawings.

DETAILED DESCRIPTION OF THE PREFERRED EMBODIMENT

Figure 1:
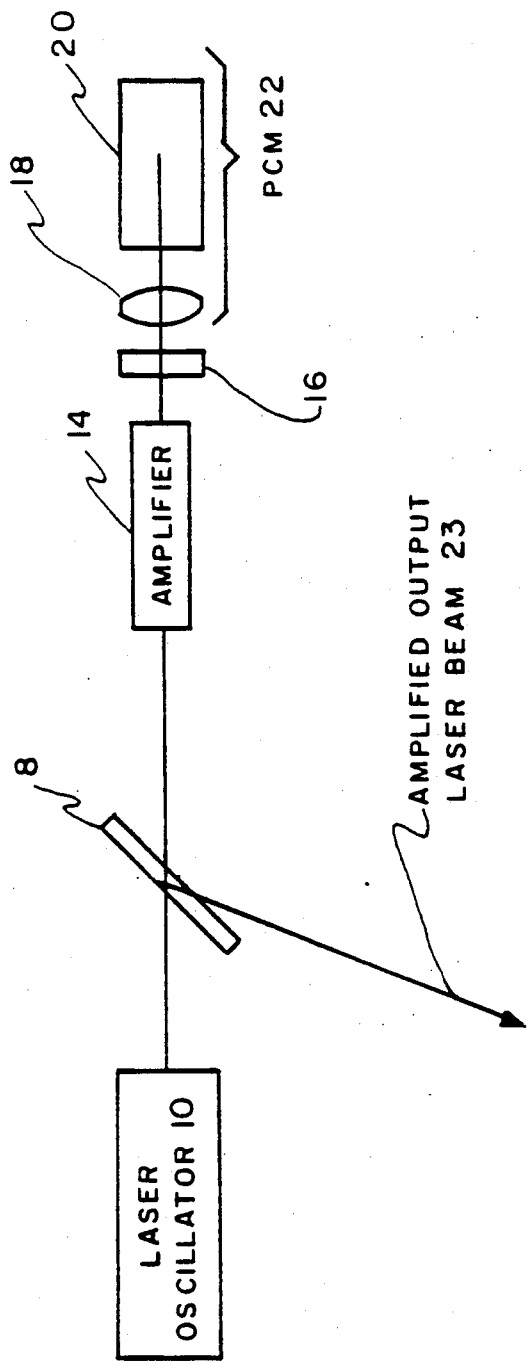
FIG. 1 illustrates schematically a prior art single phase conjugate amplifier having a thin film polarizer.

Refer to FIG. 1 for a brief discussion of the advantages and disadvantages of prior art phase conjugated laser amplifier. A laser oscillator 10 which may be of the solid state type, such as a neodymium: yttrium aluminum garnet (Nd:YAG), provides a polarized laser input beam that passes through the polarizer 8 and is shaped into a linearly polarized laser beam, say for explanation purposes a vertically polarized laser beam. The vertically polarized laser beam is amplified by amplifier 14, which should be of the same type material as oscillator 10, passed through a quarter-wave plate 16 wherein the beam becomes circularly polarized, and enters a phase conjugate mirror (PCM) 22. Mirror 22 is comprised of focusing lens 18 and a stimulated Brillouin scattering (SBS) cell 20 which provides retroreflection for the incident laser beam. Cell 20 preferably contains gas, such as methane or nitrogen, at high pressure. The incident laser beam is retroreflected back through lens 18 and through plate 16 to become linearly horizontally polarized. The amplifier 14 amplifies the input laser beam a second time and since the beam is horizontally polarized by the two passes through plate 16, the twice amplified output laser beam 23 is reflected off polarizer 8 and out of the laser amplifier system. Advantages are that the beam 23 direction is stable against any vibrations and movements within the amplifier section, i.e. within components 14, 16, 18 and 20. However, in this prior art system, the output beam 23 direction is sensitive to any motion of the polarizer 8 and may exit at an oblique angle off 8 rather than an angle close to 90°.

The present invention described herein below solves the problem of directional sensitivity of beam 23 caused by any movement of polarizer 8 and further provides an output beam direction that is in exactly the same direction as the input beam while retaining the stability of alignment of the prior art singly conjugated amplifiers.

Figure 2:
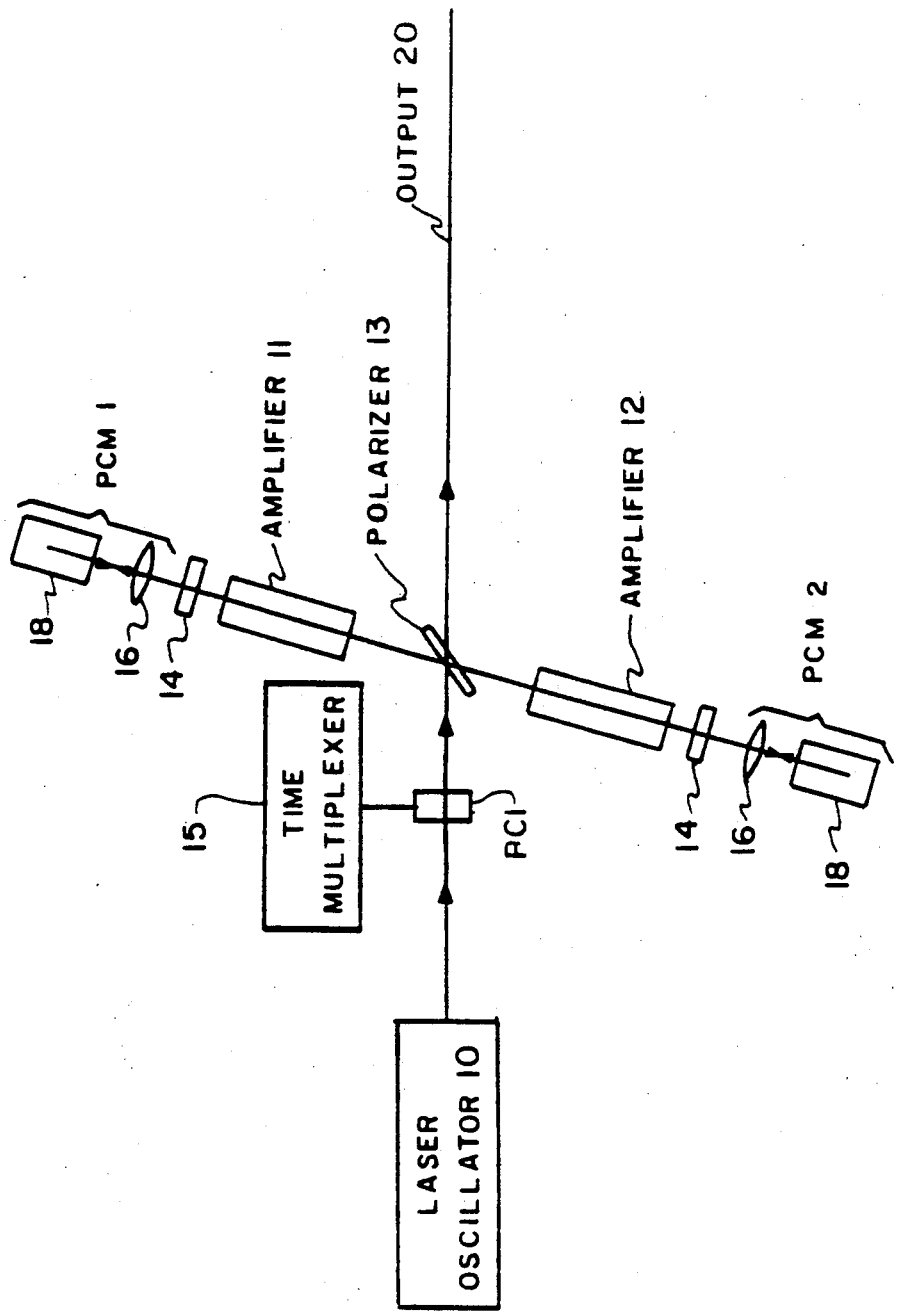
FIG. 2 illustrates schematically one double conjugate amplifier according to the invention.

Refer to FIG. 2 for an illustration of how one of the double conjugate amplifiers operates according to the invention. The laser oscillator 10 produces a laser beam, herein called the input beam, which is controlled by a half-wave voltage selectively applied by time multiplexer 15 at the Pockels cell PC1. The laser oscillator 10 and the laser amplifier should be made of the same material. The laser material is not limited to solid state but may also be gaseous or liquid.

The oscillator input beam to the double conjugate amplifiers may be originally aligned directly through polarizer 13 along an output axis 20 over which the output beam will travel when there is no voltage applied by time multiplexer 15 to the Pockels cell PC1. Even when the half-wave voltage is applied at the Pockels cell PC1 and the input beam is amplified, the output beam is along axis 20. When PC1 is activated the oscillator laser input beam polarization is rotated 90° by PC1 and is reflected off the front of polarizer 13 toward a first amplifier 11. Amplifier 11 amplifies the input beam, a quarter-wave plate 14 converts the once amplified input beam to circular polarization, and the phase conjugated mirror PCM1 retroreflects in the manner as explained herein above for the prior art. That is, focusing lens 16 focuses the beam into a stimulated Brillouin scattering cell 18 which retroreflects the beam back through lens 16 and on the return through plate 14 the beam becomes linearly polarized but with the polarization direction at 90° to the original polarization, and returns to amplifier 11. The amplifier 11 amplifies the returned 90° polarization rotated beam for a second time and the input beam is passed directly through polarizer 13 into a second amplifier 12 to be twice amplified and polarization rotated through another 90° in the same manner as for the elements 14, and 16 and 18. In this case, the phase conjugated mirror is designated as PCM2. The polarization rotated reflected input beam is returned to the polarizer 13 and is reflected therefrom as an output beam along output axis 20.

Because of the two retroreflections the output beam is exactly colinear with the oscillator input beam that passed directly through polarizer 13 when PC1 was inactivated. Thus, the colinearity feature of the input and output beams along common output axis 20 permits first aiming the laser oscillator low power beam pulses toward a desired spot or target (not shown) prior to switching on the high power amplification of the double conjugate amplifiers 11 and 12 by applying the half-wave voltage at PC1.

Figure 3:
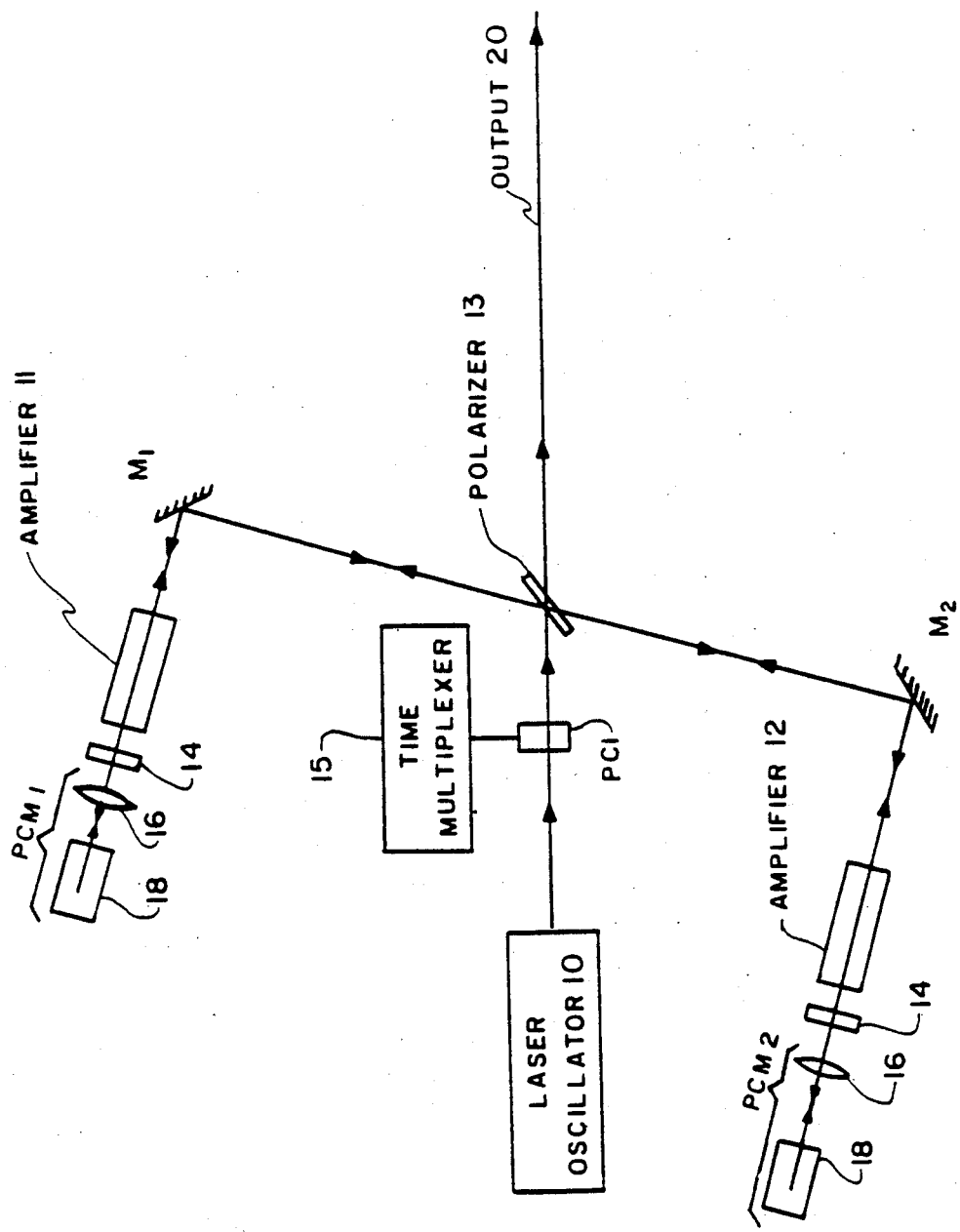
FIG. 3 illustrates use of a folded optical path between the polarizer and the amplifiers.
Figure 4:
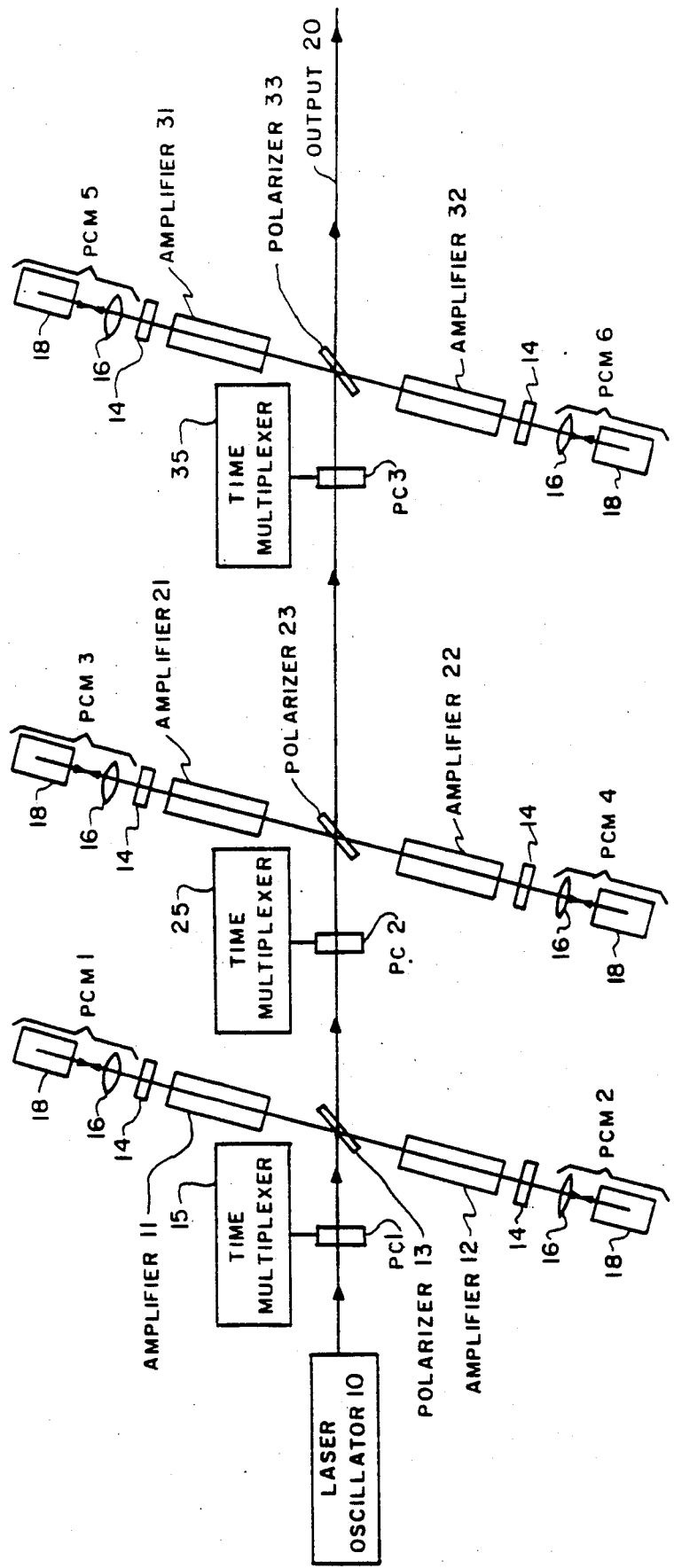
FIG. 4 shows the addition of two more double conjugate amplifiers in optical alignment.

Look now at FIG. 3 for an alternate embodiment from that of FIG. 2, but which functionally operates the same wherein the optical paths to amplifiers 11 and 12 in this instance are folded by the placement of fixed mirrors M1 and M2 respectively. The polarities of the input beam are not changed by the folded optical paths between 11 and 12. Further movement of M1 and M2 and polarizer 13 by small amounts does not effect the output beams directionality. FIG. 4 represents the cascading of a plurality of double conjugate amplifiers, herein shown as three amplifiers, in accordance with the invention. It is the combination of these amplifier pairs, i.e. double conjugate amplifiers, in the present invention that is new. The colinear output beam feature of the double conjugate amplifiers makes it feasible to cascade many of these amplifiers along an output axis 20 with the Pockels cells and polarizers.

The Pockels cells PC1, PC2, and PC3 immediately preceding polarizers 13, 23, and 33, which are respectively associated with double conjugate amplifier pairs 11 and 12, 21 and 22, and 31 and 32, permit the laser oscillator low power beam out of 10 to be routed to or bypass any of the amplifier pairs. This allows for all three of the double conjugate amplifiers to be fired simultaneously by applying half-wave voltage at PC1, PC2, and PC3 simultaneously by time multiplexers 15, 25, and 35 for producing a large energy output pulse beam colinear with the laser oscillator input beam along axis 20. Alternatively, the laser system may be switched in time-multiplexed mode to produce a high pulse repetition rate for the laser oscillator beam by synchronizing the half-wave voltage applied to the Pockels cells so that the double conjugate amplifiers are sequentially activated to twice retroreflect the two pass amplified laser oscillator beam to provide increased output beam pulse energy at a higher pulse repetition rate.

We claim:

1. A double conjugate laser amplifier system for producing a stable output laser beam in line with a laser oscillator input beam, said system comprised of:

a laser oscillator which produces a low energy oscillator laser beam therefrom directly along a laser beam axis of said system;

an amplification means comprised of a plurality of double conjugate laser amplifiers further comprised of a first and a second singly phase conjugate amplifiers laterally opposite each other about said laser beam axis;

a plurality of polarizers with one of said plurality of polarizers positioned between each of said first and second singly phase conjugate amplifiers on said laser beam axis;

a plurality of Pockels cells with one of said plurality of Pockels cells positioned on said laser beam axis immediately prior to one of said plurality of polarizers; and a means for selectively switching said amplifier means comprised of applying a half-wave voltage at each of said plurality of Pockels cells to provide a polarization rotation of said input beam through 90° for routing of said oscillator laser beam directly through or reflected off said plurality of polarizes as an input beam to said amplification means wherein said amplification means amplifies said input beam twice in each of said first and second singly phase conjugate amplifiers and reflects the amplified laser beam off said plurality of polarizers as an amplified laser output beam in exactly the same direction as said input laser beam.

2. A system as set forth in claim 1 wherein each of first and second singly phase conjugated amplifiers which receives said input beam at the input thereto and has a quarter-wave plate and a phase conjugated mirror comprised of a focusing lens and a stimulated Brillouin scattering cell at the far end thereof, wherein said input beam stays in phase as it passes through said amplifier and is made circularly polarized upon passing through said quarter-wave plate with said input beam retroreflected by said phase conjugated mirrors and is made linearly polarized but with the polarization rotated through 90° upon passing through said quarter-wave plate a second time wherein said input beam originally reflected off the input side of sad polarizer enters said first phase conjugated amplifier and is retroreflected therefrom as twice amplified input beam which is polarization rotated 90° to pass directly through said polarizer and enters said second phase conjugated amplifier and is retroreflected therefrom as a twice amplified input beam rotated through 90° to reflect off the output side of said polarizer as an output beam amplified four times from said input beam and wherein the two retro-reflections cause said output beam to be exactly colinear with said input beam.

3. A system as set forth in claim 1 wherein each of said plurality of double conjugate amplifiers is comprised of one phase conjugate amplifier and a first and a second phase conjugate mirror laterally opposite each other and in line with said one phase conjugate amplifier about said laser axis.

4. A system as set forth in claim 1 wherein said means for selectively switching said amplifier means is comprised of a plurality of time multiplexers which selectively apply said half-wave voltages at each of said plurality of Pockels cells.

5. A system as set forth in claim 4 wherein said plurality of time multiplexers apply said half-wave voltages at said plurality of Pockels cells simultaneously for larger energy generation in said output pulse.

6. A system as set forth in claim 4 wherein said plurality of time multiplexers apply said half-wave voltages at said plurality of Pockels cells sequentially to activate each of said plurality of double conjugate laser amplifiers in synchronism with input beam pulses from said laser oscillator to provide an amplifier high output pulse repetition rate.

7. A system as set forth in claim 1 wherein said plurality of double conjugate amplifiers is one.

8. A system as set forth in claim 7 wherein the optical path between said first and second phase conjugate amplifiers are folded.

9. A system as set forth in claim 1 wherein said laser oscillator and said plurality of double conjugate laser amplifiers are made of the same material.

10. A system as set forth in claim 9 wherein said laser oscillator and said plurality of double conjugate laser amplifiers are made of gaseous laser materials.

11. A system as set forth in claim 9 wherein said laser oscillator and said plurality of double conjugate laser amplifiers are made of liquid laser materials.

12. A system as set forth in claim 9 wherein said laser oscillator and said plurality of double conjugate laser amplifiers are made of solid state laser materials.

13. A system as set forth in claim 12 wherein said laser oscillator and said plurality of double conjugate laser amplifiers are neodymium: yttrium aluminum garnet lasers.

14. A system as set forth in claim 2 wherein said stimulated Brillouin scattering cell contains gas at high pressure.

15. A system as set forth in claim 14 wherein said gas is methane.

16. A system as set forth in claim 14 wherein said gas is nitrogen.

* * * * *